United States Patent
Hayashi

[11] Patent Number: 5,804,225
[45] Date of Patent: Sep. 8, 1998

[54] METHOD AND APPARATUS FOR STRETCHING BREAD DOUGH AND THE LIKE

[75] Inventor: Torahiko Hayashi, Utsunomiya, Japan

[73] Assignee: Rheon Automatic Machinery Co., Ltd., Japan

[21] Appl. No.: 642,705

[22] Filed: May 2, 1996

[30] Foreign Application Priority Data

May 2, 1995 [JP] Japan .................................... 7-132730
Nov. 9, 1995 [JP] Japan .................................... 7-317211

[51] Int. Cl.$^6$ ................. B21C 1/08; B21C 3/02
[52] U.S. Cl. ............... 425/363; 425/403.1; 425/444; 426/502; 426/504
[58] Field of Search ..................... 426/502, 504; 425/363, 367, 373, 403.1, 447, 449

[56] References Cited

U.S. PATENT DOCUMENTS

| | | | |
|---|---|---|---|
| 4,421,776 | 12/1983 | Brinkers et al. | 425/373 |
| 4,583,930 | 4/1986 | Hayashi | 425/148 |
| 4,626,188 | 12/1986 | Morgenthaler et al. | 426/502 |
| 4,631,017 | 12/1986 | Hayashi | 425/367 |
| 4,731,008 | 3/1988 | Hayashi et al. | 425/373 |
| 4,946,699 | 8/1990 | Kageyama et al. | 426/502 |
| 5,079,014 | 1/1992 | Morikawa et al. | 426/231 |
| 5,106,636 | 4/1992 | Ban et al. | 426/502 |
| 5,154,941 | 10/1992 | Hayashi | 426/502 |
| 5,209,939 | 5/1993 | Kempf | 426/502 |

FOREIGN PATENT DOCUMENTS

| | | | |
|---|---|---|---|
| 140458 | 5/1985 | European Pat. Off. | 425/372 |
| 63-54333 | 10/1972 | Japan . | |
| 7714214 | 6/1979 | Netherlands | 425/373 |

*Primary Examiner*—Khanh P. Nguyen
*Attorney, Agent, or Firm*—Brinks Hofer Gilson & Lione

[57] ABSTRACT

A bread-dough stretching apparatus includes a rotating member having a plurality of planetary rollers that revolve along a circular path, and a conveying device which is positioned below the rotating member and is spaced apart from the rotating member to allow passage of the bread dough between the rotating member and the conveying device. Each of the planetary rollers is rotatably supported by a shaft, and the conveying device includes a plurality of rollers positioned opposite the planetary rollers. The space separating the rollers of the conveying device and the rotating member gradually decreases from the inlet to the outlet of the conveying device. The rollers of the conveying device are rotated at speeds which gradually increase from an upstream roller to a downstream roller of the conveying device. The dough conveyed on the conveying device is subjected to vibrations imparted by the planetary rollers of the rotating member, thereby causing a temporary increase in fluidity due to thixotropy which allows stretching of the dough without loss of elasticity.

23 Claims, 4 Drawing Sheets

METHOD AND APPARATUS FOR STRETCHING BREAD DOUGH AND THE LIKE

BACKGROUND OF THE INVENTION

1. Field of the Invention

This invention relates to a method and an apparatus for stretching highly elastic materials, such as bread dough. More specifically, this invention relates to a method and an apparatus for producing high-quality bread from a thin sheet of bread dough which is continuously stretched on a conveyor while being subjected to vibrations.

2. Description of the Related Art

Prior art methods for automatically stretching an elastic material typically include subjecting the elastic material to stresses that exceed the yield point of the material. This creates a problem in that some of the elasticity of the materials can be permanently lost. This is a particular problem in food production, and especially in bread production. Therefore, a manual stretching operation is typically used, in place of automatic dough stretching by machines, in which a skilled operator carefully stretches the bread dough such that damage to the elasticity of the bread dough is prevented.

When untreated bread dough is automatically stretched by a machine, at least some of the elasticity of the bread dough is typically lost due to a release of fermented gas caused by the stresses associated with automatic stretching. This loss of elasticity leads to a breakdown of the gluten network structure of the bread dough. The gluten network structure of bread dough is important to the production of high quality bread. Even if a small amount of elasticity is lost from the bread dough during automatic stretching, it is difficult to produce bread having a taste and texture that is the same as bread made from bread dough stretched by a skilled manual operator.

In order to produce acceptable bread using automatic stretching, chemical additives such as potassium bromate are mixed in the dough material to enhance the gluten structure. The chemical additives produce a "membrane-forming function" which occurs when the stretched and molded dough material is rested for a certain period under a stationary condition. This process produces a partial recovery of the elasticity lost during the automatic stretching process. The molded dough material can then be cut into separate pieces and baked into bread.

As is clear, automatic stretching damages the elasticity of bread dough either by wearing out the inherent elasticity of the dough due to excessive stress, or, when a screw conveyor mechanism applies a twisting stress to the dough material, by breaking the gluten (gel) structure to deprive the material of its elasticity. In both instances, the elasticity of the bread dough is recoverable using chemical additives. However, when bread made from this treated bread dough is compared to manually prepared bread, it is apparent that the automatically stretched dough produces an inferior tasting bread. Further, the solution of using a chemical additive is an unnatural approach.

To resolve the above problems, it is an object of the present invention to provide a method and an apparatus for producing bread dough by a machine without using the chemical additives that had been used in the prior art automatic stretching method.

The "orbitary stretching apparatus", which is referred to below as a stretching apparatus having a "plurality of planetary rollers that revolve along a circular orbit," is disclosed in Japanese Patent Publication No. 63-54333 and Japanese Utility Early-Publication No. 47-13493. But these apparatuses do not have enough ability to thinly stretch dough bread having high elasticity.

SUMMARY OF THE INVENTION

As opposed to the prior-art method and apparatus wherein the elasticity is broken, the present invention provides an apparatus and method for stretching dough material to an extent that is below the yield point of the elasticity of the dough material.

More specifically, in accordance with the present invention, a periodic strong vibration is exerted on the dough material by freely rotatable rollers that orbit along a circular path. By using such a vibration, a temporary liquification phenomenon, called "a thixotropic effect", will appear in the dough. If the dough is stretched during the short period of time in which this phenomenon occurs, the bread dough can be formed into a thin sheet of bread material without breaking the gluten (gel) structure of the dough because the bread dough is not subjected to so-called "tensile stress." The thus-obtained dough material is wound up in a bar shape of any continuously desired type. The rolled material is then cut to a desired length to obtain small pieces of molded dough. Thus, the present invention differs from prior art methods wherein a small piece of bread was directly molded from a large block of the bread dough, and provides a variety of bread that is equivalent to that which is manually made, without using chemical additives.

The enhanced fluidity of the bread dough obtained by the thixotropic effect is temporary. Thus, the thinly-stretched dough produced by the present invention, when put in a stationary condition, recovers its original elasticity in a few minutes. This differs from the prior art, wherein a forcible cutting operation is performed to molded dough by depriving the dough of its elasticity. Further, the use of the thixotropic effect used in the present invention does not at all damage the gluten structure in the bread dough. This invention provides a simple method and an apparatus to thinly stretch bread dough.

According to the present invention, an apparatus for stretching bread dough includes a rotating member having a number of freely rotatable planetary rollers around its periphery. Bread dough is supplied to a conveying device having a plurality of rollers arranged relative to the arcuate periphery defined by the planetary rollers. The conveyor's rollers are located below the planetary rollers. The distance between the planetary rollers and the conveyer's rollers decreases in the downstream direction and the conveyor's rollers are driven to rotate at different speeds such that the downstream rollers are driven faster than the upstream rollers. The bread dough being conveyed by the conveying device is repeatedly pressed and vibrated from above by the action of the rotating member. This brings about a thixotropic effect in the dough to produce a temporary increase in fluidity and a temporary decrease in elasticity of the dough. In this condition of enhanced fluidity, the dough is easily stretched. This stretching is achieved due to the difference in the rotating speed of the rollers of the conveying device.

The present invention provides a method for stretching bread dough including the steps of revolving a rotating member having a plurality of freely rotatable planetary rollers mounted around the circular periphery of the rotating member, supplying the bread dough to a conveying device located below and spaced apart from the orbit of the rotating member, the conveying device having a plurality of rollers that rotate gradually faster from the inlet to the outlet of the conveying device, momentarily and repeatedly pressing the bread dough moving on the conveying device by the rotating member from above the conveying device, continuously vibrating the bread dough to obtain a temporary fluidity effect in the bread dough by using a thixotropy effect gained by the vibration, and decreasing the space between the rotating member and the conveying device and increasing the speed of the rollers of the conveying device, to produce a thin and stretched bread dough supplied to the conveying device.

The present invention also provides a bread dough stretching apparatus including a rotating member having a plurality of planetary rollers that revolve along a circular orbit (path) and a conveying device located below and spaced apart from the rotating member to stretch the bread dough in a curved space between the rotating member and conveying device. Each of the planetary rollers of the rotating member is freely and rotatably mounted on shafts connected to a wheel of the rotating member. The curved space is defined between the conveying device and the planetary rollers located above the conveying device, the space becoming gradually narrower from an inlet where the bread dough enters the space, to an outlet thereof. The space is defined by a distance between each of the rollers constituting the conveying device and a circular revolving orbit of the planetary rollers located above the conveying device, this distance gradually decreasing toward the outlet. A speed-setting device is provided to gradually increase the speed of the rollers of the conveying device toward the outlet, so as to adjust the bread-dough stretching effect.

Further, the present invention provides a bread-dough stretching apparatus having a rotating member provided with a plurality of planetary rollers that revolve along a circular orbit and a conveying device located spaced apart and below the rotating member to stretch the bread dough. The planetary rollers are freely and rotatably mounted on shafts connected to a wheel of the rotating member. The conveying device has a plurality of rollers positioned opposite to the planetary rollers so as to form a curved space which gradually decreases from an inlet to an outlet thereof. A drive plate is provided to forcibly rotate the planetary rollers, the drive plate being located along the outer orbital circle of the planetary rollers and adjacent the inlet of the conveying device.

Further, the present invention provides a bread-dough stretching apparatus having a rotating member provided with a plurality of planetary rollers that revolve along a circular orbit, a conveying device for stretching the bread dough located below and spaced apart from the rotating member, and a discharge device positioned at the outlet of the conveying device. Each of the planetary the rollers of the rotating member is freely and rotatably mounted on shafts which are equally spaced around the circular orbit. The plurality of the rollers of the conveying device are mounted so that the space between the rotating member and the conveying device gradually decreases from the upstream end of the conveying device toward the downstream end. Further, the rotational speeds of the rollers of the conveying device are made to increase from the upstream end to the downstream end, and the rotational speed of the roller of the conveying device that is positioned at the outlet of the conveying device is made to be faster than the discharging speed of the discharge device.

When the bread dough is conveyed on the conveying device as the planetary rollers of the rotating member are rotated to contact an upper surface of the bread dough, the dough located in the space is simultaneously stretched by the planetary rollers and the rollers of the conveying device at least at two points, to enhance the stretching effect. Further, the rotational speed of the roller positioned at the outlet of the conveying device is made to be faster than the speed of the discharge conveyor to allow for contraction as elasticity of the bread dough is recovered.

DETAILED DESCRIPTION

Figure 1:
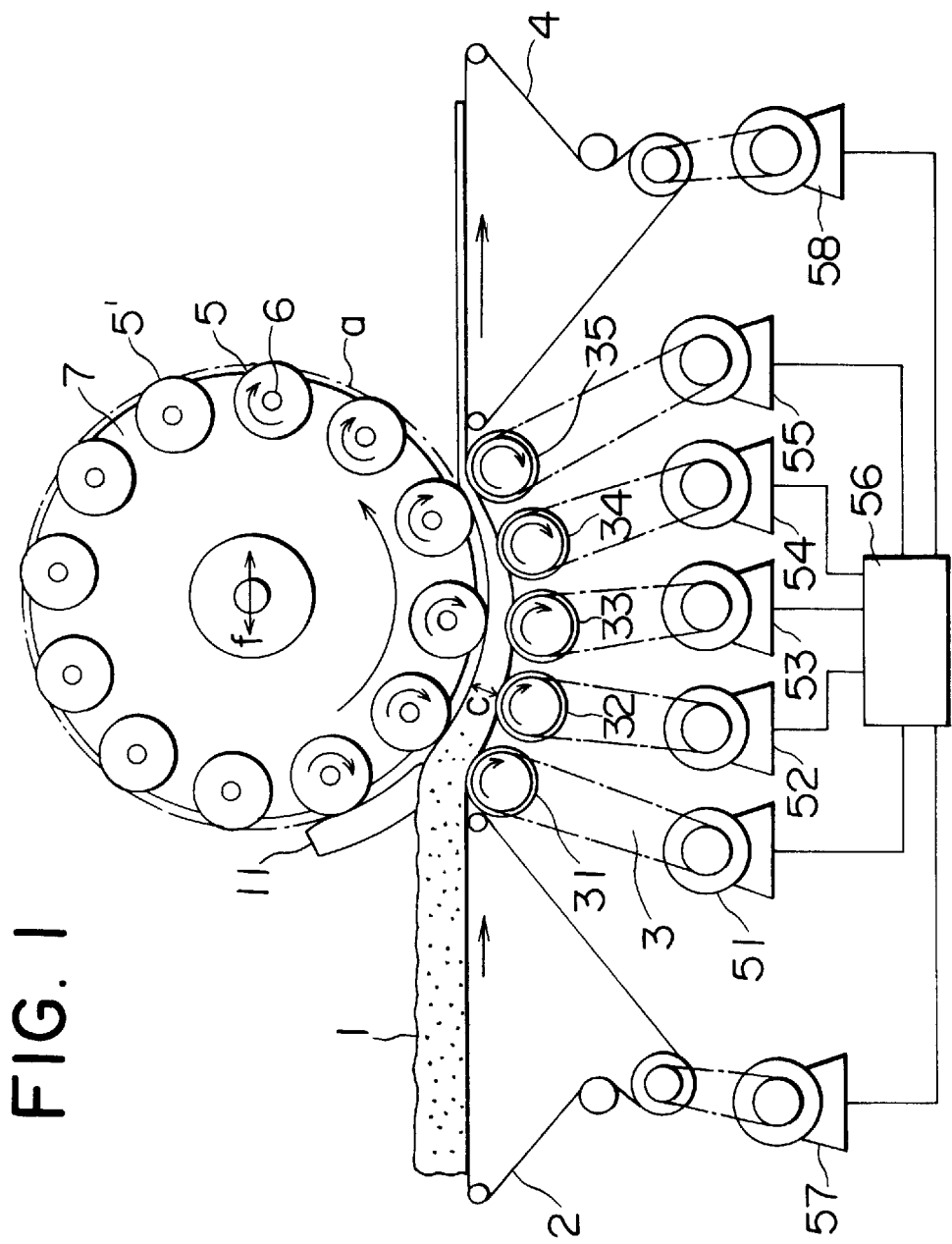
FIG. 1 is an overall side view of one embodiment of the present invention.

A first embodiment of the present invention will now be explained with reference to FIGS. 1 and 2.

An apparatus for stretching dough in accordance with the first embodiment includes a dough supply conveyor 2, a conveying device 3 located downstream of the dough supply conveyor 2, and a discharge conveyor 4 located downstream of the conveying device 3. As shown in FIG. 1, a quantity of bread dough is conveyed from the dough supply conveyor 2 onto the conveying device 3, and from the conveying device 3 directly onto the discharge conveyor 4.

The conveying device 3 includes a plurality of rollers 31–35 which are driven to rotate by motors 51–55.

Above the conveying device 3 is a rotating member including a plurality of planetary rollers 5, 5' which are freely and rotatably mounted to shafts 6 fixed to a wheel 7. The planetary rollers 5, 5' are equally spaced and arranged in a circle around a periphery of the wheel 7 such that they orbit along a circular path when the wheel 7 is rotated. The shafts 6 are parallel to the rollers 31–35 of the conveying device 3. Thus, the planetary rollers 5, 5' remain parallel to the conveying device.

Figure 2:
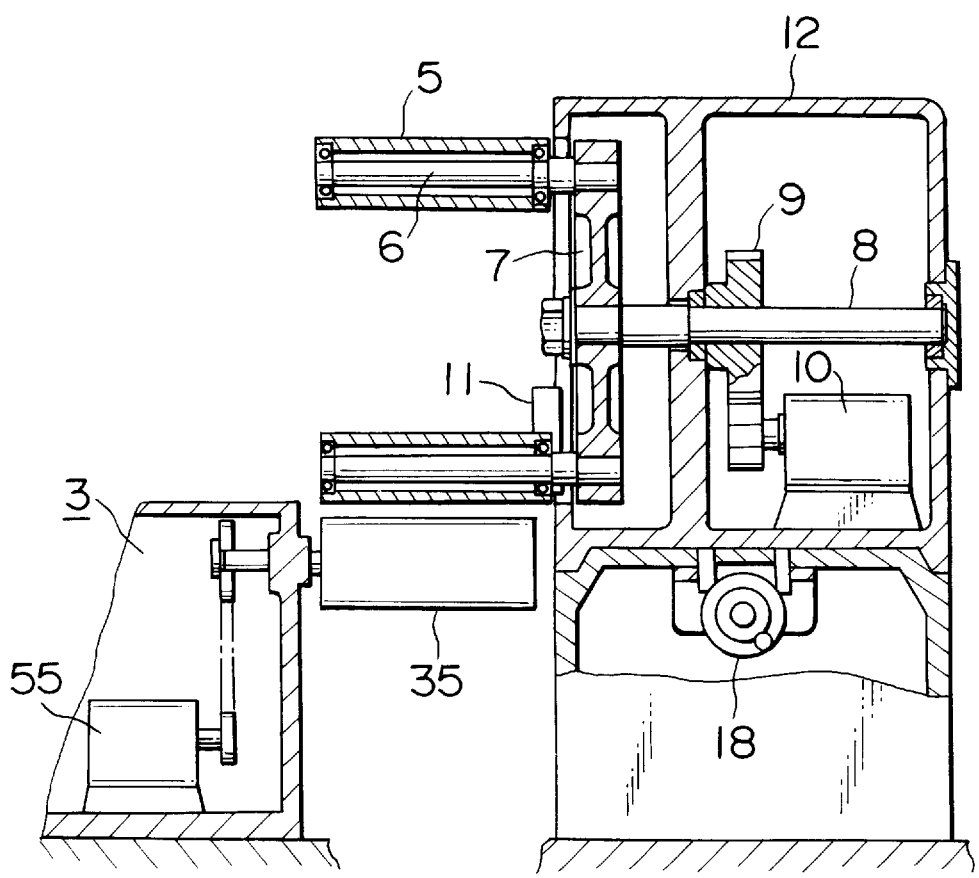
FIG. 2 is a cross-sectional front view of the first embodiment.

Referring to FIG. 2, the wheel 7 is fixed to a drive shaft 8 that is supported by a frame 12, and the wheel 7 is rotated by a motor 10 via a gear 9 mounted on the drive shaft 8.

A drive plate 11 is provided at a position above the supply conveyor 2 and at the downstream end thereof such that the outer peripheries of the planetary rollers 5, 5' contact the drive plate 11. The drive plate 11 imparts an initial rotation to the freely-rotatable planetary rollers 5, 5' when the wheel 7 is rotated by the motor 10. The planetary rollers 5, 5' thus rotated by the drive plate 11 roll on an upper surface of the bread dough 1, thereby pressing the bread dough 1 against the rollers 31–35 of the conveying device 3.

The rollers 31–35 of the conveying device 3 are arranged such that the bread dough is conveyed along an arcuate path which is located below the rotating member. A space having a width C is formed between the phantom circular path "a" (formed by an outermost surface of the planetary rollers 5, 5') and the arcuate path (formed by opposing upper surfaces of the rollers 31–35). The space has an inlet located adjacent the upstream roller 31 and an outlet located adjacent the downstream roller 35. The width C of this space gradually decreases from the upstream roller 31 towards the downstream roller 35.

The rollers 31–35 are rotated by motors 51–55 through chains or drive shafts such that they rotate toward the downstream direction (i.e., clockwise in FIG. 1). The speed of the each of motors 51–55 can be adjusted individually by an adjusting device 56 such as an inverter. Thus, the rotational speed of the rollers 31–35 can be increased toward the outlet of the space between the rotating member and the conveying device 3 (i.e., in the dough-stretching direction) based on the thixotropic effect.

In the first embodiment shown in FIG. 1, the rollers 31–35 are rotated such that the rotational speed of the rollers 31–35 gradually becomes faster in the conveying direction. That is, upstream roller 31 is rotated slower than the roller 32, which is rotated slower than roller 33, which is rotated slower than roller 34, which is rotated slower than downstream roller 35. The increase of the rotational speed of the rollers 31–35 is inversely proportion to the decrease of the width C of the space separating the rotating member and the conveying device 3.

The pressure applied by the rollers 5, 5' on the bread dough 1 is adjustable by moving the wheel 7 along a direction indicated by arrow "f" in FIG. 1. Adjustment of wheel 7 is performed by rotating a handle 18 (see FIG. 2). Movement of the wheel 7 along the direction "f" adjusts the width C at the outlet of the space separating the rotating member and the conveying device 3, thereby adjusting the applied pressure. For example, the pressure on bread dough 1 is decreased by moving the wheel 7 in a leftward direction along direction "f", and increased by moving the wheel 7 in a rightward direction.

The speed of the supply conveyor 2 is equal to or less than that of the roller 31, and the speed of the discharge conveyor 4 is equal to or greater than that of the roller 35.

In one embodiment, the angular spacing between the adjacent planetary rollers 5, 5' is twice the angular spacing between the rollers 31–35 of the conveying device. This allows the planetary rollers 5, 5' to be located alternately in relation to the rollers 31–35, so that the generating lines of the planetary rollers 5, 5' and the rollers 31–35 of the conveying device 3 meet each other almost simultaneously.

Figure 3:
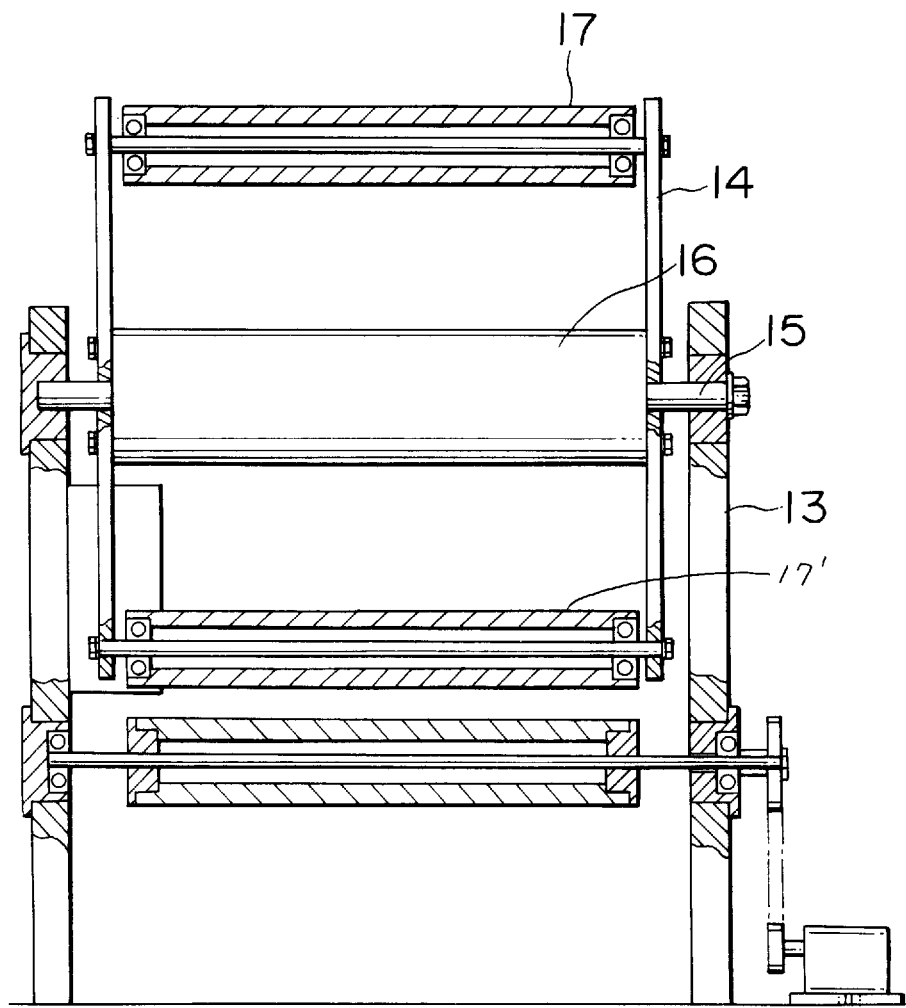
FIG. 3 is a cross-sectional front view of a second embodiment of the present invention.

In a second embodiment shown in FIG. 3, a plurality of planetary rollers 17, 17' are supported at both ends thereof by a rotary wheel 14, as opposed to the structure of FIG. 2 wherein the planetary rollers 5, 5' are supported in a cantilever fashion. The rotary wheel 14 is supported by a frame 13, and a motor pulley 16 is mounted on a main shaft 15 of the wheel 14. The planetary rollers 17, 17' revolve as the motor pulley 16 rotates. The remaining structure of the second embodiment will not be explained, as it is the same as that of the first embodiment.

The effect and function of the present invention are as follows:

The bread dough 1 conveyed by the upstream supply conveyor 2 is supplied to the conveying device 3 and is gripped between the group of the planetary rollers 5, 5' that rotate at a high speed, and the conveying device 3. The bread dough is gradually stretched by rollers 31–35, whose rotational speeds are made to be progressively faster to discharge the dough by the discharge conveyor 4.

The stretching effect will now be explained. When the freely rotating planetary rollers 5, 5' pass above the rollers 31–35, a repeated pressing and releasing vibration is imparted to the bread dough. This vibration generates a thixotropy effect in which the fluidity of the dough, which is normally low, is temporarily increased (i.e., the viscosity and elasticity are decreased). During this state of temporary high fluidity, the bread dough 1 is easily stretched due to the difference in the speed of the rollers 31–35.

Experiments show that when the bread dough 1 receives 1,000 beating actions per minute by the rollers 31–35 and the planetary rollers 5, 5' by setting the speed of the planetary rollers 5, 5' as 30 and 70 m per minute, the bread dough was easily and temporarily extended by the thixotropy effect and a stretching effect was obtained that was not realized by the prior-art stretching method.

If the planetary rollers 5, 5' and the rollers 31–35 press the bread dough at least simultaneously at two points by oppositely aligning the generating lines of the planetary rollers and the rollers 31–35, the speed difference at these two points of the stretching portion will further and effectively stretch the bread dough.

Figure 4:
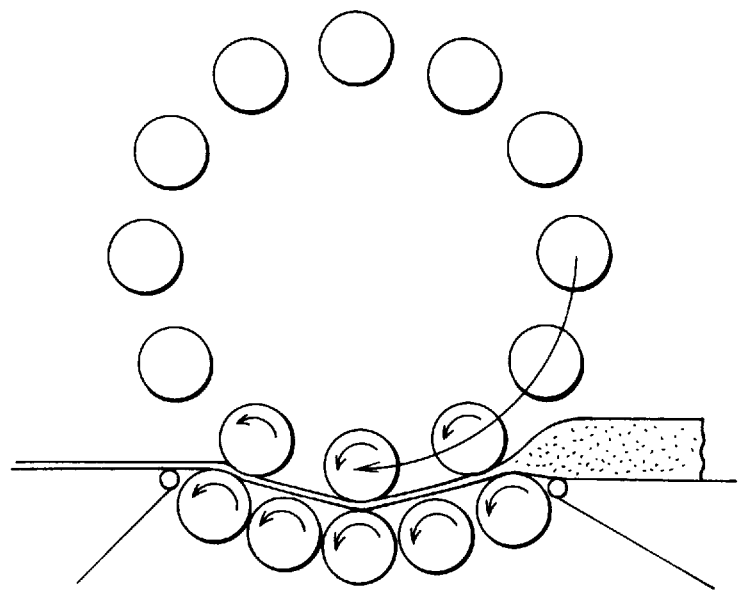
FIG. 4 is an explanatory view showing the function of the present invention.
Figure 5:
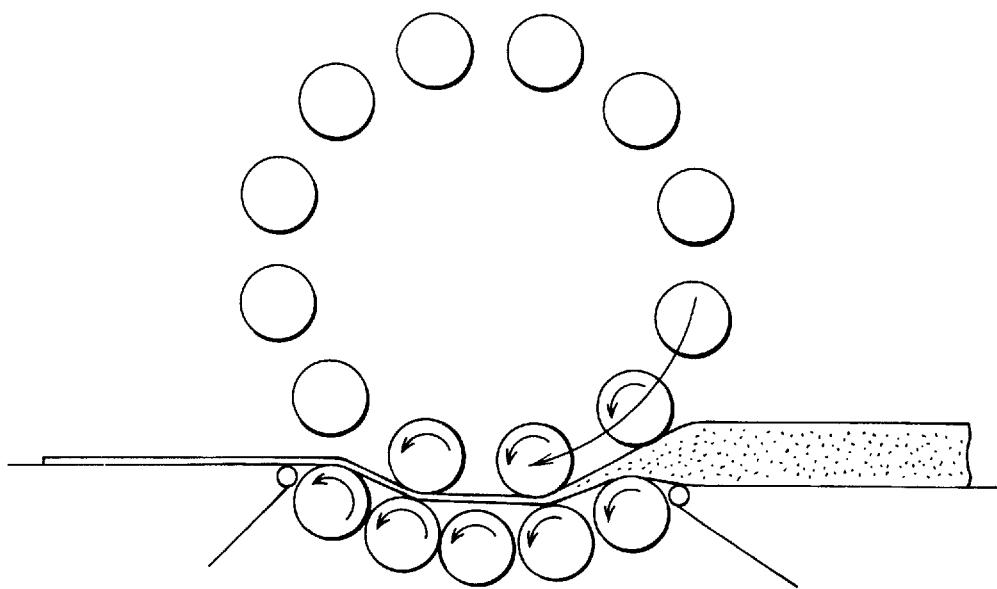
FIG. 5 is also an explanatory view showing the function of the present invention.

As shown in FIGS. 4 and 5, the bread dough is stretched at two or three points in this stretching portion defined by the rollers 5, 5' and rollers 31–35 and the stretching points repeatedly vary as the rollers 5, 5' revolve.

Portions of the bread dough that are not stretched are freely stretched without receiving external resistance and are repeatedly stretched in the stretching area.

Since the beating effect (thixotropy effect) can be freely adjusted by changing the rotational speed of the wheel 7, the stretching ratio and the desired production speed of the dough supplied can be adjusted.

In the present invention the bread dough is conveyed by a plurality of rollers 31–35. The planetary rollers 5, 5' rotatably move on the upper surface of the bread dough, so that no frictional stress is imparted to the bread dough, and the thixotropy effect is generated by a vibrating effect of a short frequency.

By this vibration the thixotropy effect is obtained in the bread dough 1, so that the dough easily flows and is stretched by the difference in speed of the rollers 31, 32, 33, 34, and 35 of the conveying device.

The drive plate 11 helps to initially and forcibly rotate the rollers 5, 5' to give rotational inertia to the rollers to have them easily rotate on the upper surface of the bread dough. Thus the bread dough supplied to the roller 31 cannot be forcibly pulled by the planetary rollers 5, 5'.

In the present embodiment, the rotational speed of the roller 35 is the same or slower than the speed of the discharge conveyor 4. However, the bread dough, after it is stretched by the rollers 31–35, tends to shrink (contract) on the discharge conveyor 4 due to its inherent elasticity, so that it becomes difficult to produce bread dough having a desired thickness. To prevent such a phenomenon, and considering the shrinkage of the bread dough, the rotational speed of the roller 35 or 34 can be made to be faster than the conveying speed of the discharge conveyor 4. In this case the bread dough is greatly extended by the roller 35 or 34 to adjust the shrinkage of the stretched bread dough, so that dough of a desired thickness is obtained.

THE EFFECT OF THE INVENTION

As explained above, when the bread dough is stretched in the present invention, a temporary fluidity is given to it by thixotropy, and at the same time, due to this thixotropy effect, the bread dough can be stretched under a low pressure.

By temporarily generating stretchability in the bread dough, the dough is fully extended by the speed difference of the rollers of the conveying device. A thin and continuous bread dough can be easily obtained under a low pressure without breaking the gluten structure of the bread dough.

I claim:

1. A bread-dough stretching apparatus comprising:

a rotating member including a plurality of planetary rollers freely rotatably mounted on parallel shafts, the planetary rollers being arranged to move along a circular path, a conveying device including a plurality of rollers located below and spaced apart from the rotating member, the plurality of rollers being arranged to form an arcuate path such that a curved space is formed between a portion of the circular path of the planetary rollers and the arcuate path of the conveying device, the curved space having an upstream end and a downstream end, the curved space becoming gradually narrower from the upstream end to the downstream end, and a speed-setting device for individually controlling the rotating speed of ones of the plurality of rollers of the conveying device such that the rotating speeds of the plurality of rollers of the conveying device gradually increase from the upstream end to the downstream end.

2. A bread-dough stretching apparatus comprising:

a rotating member including a wheel having an axis, a plurality of parallel shafts fixedly attached to the wheel, and a plurality of planetary rollers freely rotatably mounted on the shafts such that the planetary rollers move along a circular path when the wheel is rotated about the axis, a conveying device located below the rotating member, the conveying device including a plurality of rollers arranged in an arcuate path which defines a curved elongated space with the circular path of the planetary rollers, the curved space having an upstream end and a downstream end, the curved space becoming gradually narrower from the upstream end to the downstream end, and a speed-setting device including a plurality of motors independently driving ones of the plurality of rollers of the arcuate device so that the rotating speeds of the plurality of rollers of the conveying device gradually increase from the upstream end to the downstream end.

3. A bread-dough stretching apparatus comprising:

a rotating member including a wheel having an axis, a plurality of parallel shafts fixedly attached to the wheel, and a plurality of planetary rollers freely rotatably mounted on the shafts such that the planetary rollers move along a circular path when the wheel is rotated about the axis, and a conveying device located below the rotating member, the conveying device including a plurality of rollers arranged in an arcuate path which defines a curved elongated space with the circular path of the planetary rollers, the curved space having an upstream end and a downstream end, the curved space becoming gradually narrower from the upstream end to the downstream end, and a discharge device positioned at the downstream end of the curved space, wherein the rotational speeds of the plurality of rollers of the conveying device are controlled such that the speeds of the plurality of rollers of the conveying device gradually increase from the upstream end to the downstream end, and wherein a rotational speed of the roller of the conveying device that is positioned at the downstream end of the conveying device is faster than a discharging speed of the discharge device.

4. A bread-dough stretching apparatus of claim 1, wherein the planetary rollers and the plurality of rollers of the conveying device are located at least at two points to cause the planetary rollers and the plurality of rollers of the conveying device to simultaneously face each other, thereby to increase the stretching effect of the dough.

5. A bread-dough stretching apparatus of claim 2, wherein the planetary rollers and the plurality of rollers of the conveying device are located at least at two points to cause the planetary rollers and the plurality of rollers of the conveying device to simultaneously face each other, thereby to increase the stretching effect of the dough.

6. A bread-dough stretching apparatus of claim 3, wherein the planetary rollers and the plurality of rollers of the conveying device are located at least at two points to cause the planetary rollers and the plurality of rollers of the conveying device to simultaneously face each other, thereby to increase the stretching effect of the dough.

7. A bread-dough stretching apparatus of claim 1, wherein an amount of bread dough located in the curved space is subjected to vibrations through contact with the planetary rollers, and wherein the frequency of the vibrations can be changed by varying the rotational speed of the rotating member, regardless of the conveying speed of the conveying device.

8. A bread-dough stretching apparatus of claim 2, wherein an amount of bread dough located in the curved space is subjected to vibrations through contact with the planetary rollers, and wherein the frequency of the vibrations can be changed by varying the rotational speed of the rotating member, regardless of the conveying speed of the conveying device.

9. A bread-dough stretching apparatus of claim 3, wherein an amount of bread dough located in the curved space is subjected to vibrations through contact with the planetary rollers, and wherein the frequency of the vibrations can be changed by varying the rotational speed of the rotating member, regardless of the conveying speed of the conveying device.

10. A bread-dough stretching apparatus of claim 4, wherein an amount of bread dough located in the curved space is subjected to vibrations through contact with the planetary rollers, and wherein the frequency of the vibrations can be changed by varying the rotational speed of the rotating member, regardless of the conveying speed of the conveying device.

11. A bread-dough stretching apparatus of claim 1, further comprising a supplying conveyor located adjacent the upstream end of the curved space and a discharge conveyor located adjacent the downstream end of the curved space, wherein a conveying speed of the supplying conveyor is equal to or less than a rotational speed of an upstream-end roller of the plurality of rollers of the conveying device, and a conveying speed of the discharge conveyor is equal to or less than a rotational speed of the downstream-end roller of the plurality of rollers of the conveying device.

12. A bread-dough stretching apparatus of claim 2, further comprising a supplying conveyor located adjacent the upstream end of the curved space and a discharge conveyor located adjacent the downstream end of the curved space, wherein a conveying speed of the supplying conveyor is equal to or less than a rotational speed of an upstream-end roller of the plurality of rollers of the conveying device and a conveying speed of the discharge conveyor is equal to or less than a rotational speed of a downstream-end roller of the plurality of rollers of the conveying device.

13. A bread-dough stretching apparatus of claim 4, further comprising a supplying conveyor located adjacent the upstream end of the curved space and a discharge conveyor located adjacent the downstream end of the curved space, wherein a conveying speed of the supplying conveyor is equal to or less than a rotational speed of an upstream-end roller of the plurality of rollers of the conveying device, and a conveying speed of the discharge conveyor is equal to or less than a rotational speed of the downstream-end roller of the plurality of rollers of the conveying device.

14. A bread-dough stretching apparatus of claim 5, further comprising a supplying conveyor located adjacent the upstream end of the curved space and a discharge conveyor located adjacent the downstream end of the curved space, wherein a conveying speed of the supplying conveyor is equal to or less than a rotational speed of an upstream-end roller of the plurality of rollers of the conveying device and a conveying speed of the discharge conveyor is equal to or less than a rotational speed of a downstream-end roller of the plurality of rollers of the conveying device.

15. A bread-dough stretching apparatus of claim 2, further comprising:

a drive plate located adjacent the upstream end of the curved space, the drive plate being located along the circular path of the planetary rollers such that the planetary rollers are forcibly rotated by the drive plate when the wheel is rotated about the axis.

16. A bread-dough stretching apparatus of claim 1 wherein the conveying device includes at least four rollers.

17. A bread-dough stretching apparatus of claim 2 wherein the conveying device includes at least four rollers.

18. A bread-dough stretching apparatus of claim 1 wherein:

ones of the planetary rollers are angularly spaced apart from an adjacent planetary roller by a first angular spacing;

ones of the plurality of rollers of the conveying device are angularly space apart from an adjacent roller of the plurality by a second angular spacing; and the first angular spacing is two times the second angular spacing.

19. A bread-dough stretching apparatus of claim 2 wherein:

ones of the planetary rollers is angularly spaced apart from an adjacent planetary roller by a first angular spacing;

ones of the plurality of rollers of the conveying device is angularly space apart from an adjacent roller of the plurality by a second angular spacing; and the first angular spacing is approximately two times the second angular spacing.

20. A bread-dough stretching apparatus of claim 1 wherein:

the rotating member is movable with respect to the conveying device such that moving the rotational member adjusts the width of the curve space at the downstream end.

21. A bread-dough stretching apparatus of claim 2 wherein:

the rotating member is movable with respect to the conveying device such that moving the rotational member adjusts the width of the curve space at the downstream end.

22. A bread-dough stretching apparatus of claim 1 wherein the plurality of rollers in the conveying device are positioned so that dough located in the curve space contacted by the plurality of rollers of the conveying device.

23. A bread-dough stretching apparatus of claim 2 wherein the plurality of rollers in the conveying device are positioned so that dough located in the curve space contacted by the plurality of rollers of the conveying device.

\* \* \* \* \*

UNITED STATES PATENT AND TRADEMARK OFFICE
CERTIFICATE OF CORRECTION

PATENT NO. : 5,804,225
DATED : September 8, 1998
INVENTOR(S) : Torahiko Hayashi

It is certified that error appears in the above-indentified patent and that said Letters Patent is hereby corrected as shown below:

In claim 18, line 7, replace "space" with --spaced--.

In claim 19, line 7, replace "space" with --spaced--.

In claim 22, line 3, after "space" insert --is--.

In claim 23, line 3, after "space" insert --is--.

Signed and Sealed this

Fourth Day of May, 1999

Attest:

Attesting Officer

Q. TODD DICKINSON

Acting Commissioner of Patents and Trademarks